US007085736B2

(12) United States Patent
Keezer et al.

(10) Patent No.: US 7,085,736 B2
(45) Date of Patent: Aug. 1, 2006

(54) RULES-BASED IDENTIFICATION OF ITEMS REPRESENTED ON WEB PAGES

(75) Inventors: Paula Keezer, San Francisco, CA (US); Brad Tofel, San Francisco, CA (US)

(73) Assignee: Alexa Internet, San Francisco, CA (US)

( * ) Notice: Subject to any disclaimer, the term of this patent is extended or adjusted under 35 U.S.C. 154(b) by 920 days.

(21) Appl. No.: 09/794,952

(22) Filed: Feb. 27, 2001

(65) Prior Publication Data

US 2002/0143659 A1 Oct. 3, 2002

(51) Int. Cl.
G06F 17/30 (2006.01)
(52) U.S. Cl. .................. 705/27; 707/103; 715/513
(58) Field of Classification Search .............. 705/26, 705/27; 707/103; 715/513
See application file for complete search history.

(56) References Cited

U.S. PATENT DOCUMENTS

| 6,035,330 | A  | * | 3/2000  | Astiz et al. ............... 709/218 |
| 6,175,838 | B1 | * | 1/2001  | Papierniak et al. ......... 707/203 |
| 6,282,548 | B1 |   | 8/2001  | Burner et al. |
| 6,286,002 | B1 | * | 9/2001  | Axaopoulos et al. ......... 707/10 |
| 6,430,624 | B1 | * | 8/2002  | Jamtgaard et al. .......... 709/246 |
| 6,542,912 | B1 | * | 4/2003  | Meltzer et al. ........... 715/501.1 |
| 6,647,381 | B1 | * | 11/2003 | Li et al. ....................... 707/3 |
| 6,654,734 | B1 | * | 11/2003 | Mani et al. .................... 707/2 |
| 6,687,734 | B1 | * | 2/2004  | Sellink et al. ............. 709/203 |
| 6,691,163 | B1 |   | 2/2004  | Tufts |
| 6,920,609 | B1 |   | 7/2005  | Manber et al. |
| 2001/0054049 | A1 | * | 12/2001 | Maeda et al. .............. 707/517 |
| 2002/0010709 | A1 | * | 1/2002  | Culbert et al. ............. 707/500 |
| 2002/0010715 | A1 | * | 1/2002  | Chinn et al. .............. 707/514 |
| 2002/0105537 | A1 | * | 8/2002  | Orbanes et al. ............ 345/733 |
| 2002/0109704 | A1 | * | 8/2002  | Rajarajan et al. ........... 345/619 |
| 2002/0143819 | A1 | * | 10/2002 | Han et al. ................. 707/513 |

FOREIGN PATENT DOCUMENTS

GB 2354850 A * 4/2001

OTHER PUBLICATIONS

PR Newswire, Data junction® wins intelligent enterprise readers choice award for the third consecutive year, Date Oct. 11, 2000.*
PR Newswire, Data Junction announces support for IBM's MQSeries, dated May 16, 2000.*

(Continued)

*Primary Examiner*—Mark Fadok
(74) *Attorney, Agent, or Firm*—Knobbe, Martens, Olson & Bear LLP

(57) ABSTRACT

The Document Object Model (DOM) of a sampled web page is used to create a rule that extracts item-related data from web pages having a similar DOM structure to the sampled web page. In response to a user request for such a web page, the rule is retrieved from a data server based on the page's URL, and is applied to the DOM of the web page to extract item-identifying data. The item is then identified—preferably by the data server—by matching the item-identifying data to an item in a database. Supplemental information about the item is then retrieved from the database and supplied to the user's computer for viewing in conjunction with the requested page. In a preferred embodiment, the rule is retrieved from the data server and applied to the web page by a client application that runs in conjunction with a web browser.

14 Claims, 9 Drawing Sheets

OTHER PUBLICATIONS

Infoworld, XML Junction transforms source data, Dated, Apr. 24, 2000.*

Paul Williams, IBM MQSeries Commercial Messaging, ACM SIGICE Bulletin, dated Apr. 4, 1995.*

M. Roscheisen, C. Mogensen and T. Winograd, "*Beyond browsing: shared comments, SOAPs, trails, and on-line communities*," Computer Networks and ISDN Systems 27, Proceedings of the Third International World-Wide Web Conference, pp. 739-749, dated Apr. 10-14, 1995.

M. Rocheisen, C. Mogensen and T. Winograd, "*Shared Web Annotations As A Platform for Third-Party Value-Added Information Providers: Architecture, Protocols, and Usage Examples*" Technical Report CSDTR/DLTR, ComMentor, pp. 1-32, printed on Dec. 20, 1999.

D. Plotnikoff, "*Navigation tools help the Web traveler*," San Jose Mercury News Mercury Center, pp. 1-3, dated Feb. 5, 2000.

1 page internet printout of New Flyswat 2.0, Answers faster, Simpler, And everywhere, printed on feb. 14, 2000.

1 page internet printout of flyswat—The smart way to Buzz through the Web, printed on Dec. 20, 1999.

2 page internet printout of GuruNet—Your Instant Expert, printed on Feb. 14, 2000.

Press Release, "*Third Voice Launches Tool to Democratize the Internet by Giving Every Reader a Voice on Every Web Site*," ThirdVoice.com, pp. 1-2, printed on Dec. 20, 1999.

Press Release, "*Third Voice Captures People's Voice*," Third Voice.com, pp. 1-3, printed on Dec. 20, 1999.

2 page internet printout of Clickthebutton, printed on Dec. 21, 1999.

2 page internet printout of Results from Clickthebutton, printed on Dec. 20, 1999.

Press Release, "*Annotate gets rid of banners*," New York Post at Annotate.net and the Press, dated Dec. 6, 1999.

3 page internet printout of "*About The Agent*," at rusure. com, printed on Dec. 20, 1999.

2 page internet printout of "*How It All Began? (The Comparative Shopping History)*," printed on Dec. 20, 1999.

Press Release, "*Internet Start-Up dash.com Receives $12.1 Million to Launch First Mobile Shopping Portal,*" dash.com, pp. 1-2, printed Dec. 21, 1999.

M. Kane, ZDNet News, "*Internet Program lets shoppers Dash for rebates*," ZDNet.com, dated Aug. 16, 1999.

U.S. Appl. No. 09/820,207, filed on Mar. 28, 2001.

* cited by examiner ical duplicate, has been submitted. The directory con-
RULES-BASED IDENTIFICATION OF ITEMS REPRESENTED ON WEB PAGES Computer Program Listing Appendix This specification inlcudes a Computer Program Listing Appendix submitted on compact disc and incorporated herein by reference. One compact disc, accompanied by an identical duplicate, has been submitted. The directory contents of the compact disc are listed below:

```
Volume in drive D is ALEXAI007A
Volume Serial Number is 2D3A-8703
Directory of D:\
ALXPATH   JS        9,140    01-28-01   2:19p alxpath.js
ALXSTA~8  JS       15,898    01-28-01   2:19p alxstag_client.js
          2 file(s)          25,038 bytes
          0 dir(s)                 0 bytes free
```

The copyright owner has no objection to the reproduction of this Computer Program Listing Appendix as part of this patent document, but reserves all other copyrights whatsovever.

BACKGROUND OF THE INVENTION

1. Field of the Invention

This invention relates generally to the Internet and the World Wide Web and, more particularly, the invention relates to methods and systems for identifying items represented on web pages and for providing supplemental information about items represented on web pages.

2. Description of the Related Art

Web pages provide a highly flexible and effective medium for presenting information to people. The information on any particular web page is generally not, however, optimized for substantive analysis by machine or computer.

One type of substantive analysis of a web page that can be automated is a determination as to what item or items are represented on a web page. An item can be any identifiable thing, such as a product, a service, a job listing, a company, or a person. Prior technology has generally relied upon regular expression matching, which can be unreliable and which may require substantial processing. The present invention seeks to address this problem among others.

SUMMARY OF THE INVENTION

In a preferred embodiment, the present invention utilizes the Document Object Model (DOM) representation of a sampled web page to create a rule that extracts data from web pages having a similar DOM structure to the sampled web page. The DOM is an object-oriented interface supported by most popular web browsers through which a displayed web page can be accessed and manipulated. The DOM provides a structured graph representation of a web page with nodes that represent each HTML (Hypertext Markup Language) tag.

In general, within a single domain or web site, when information on different web pages appears to be displayed in a similar structure, a similar structure is actually being used. Pages that have a similar HTML structure will also have a similar DOM. Furthermore, pages that may even appear substantially different may have a similar DOM structure with respect to the nodes of the DOM that are relevant to a representation of an item of interest. Generally, content providers or web retailers benefit from code or template reuse, and as a result, multiple web pages will have a similar HTML/DOM structure. A preferred embodiment utilizes the structural representation of web pages provided by the DOM to provide a powerful tool through which items can be identified on web pages.

The DOM is a well-documented utility that has been dealt with at length by the World Wide Web Consortium (www.w3.org). One skilled in the art will be familiar with the DOM and therefore the details of the DOM will not be presented herein. Although the present invention refers the Document Object Model in particular, it will be apparent to one skilled in the art that other representations of web pages that allow the identification of page elements based upon the structure of a page can be used.

In one embodiment, a rule is created based upon the DOM or other structured graph representation of a first web page and subsequently applied to a second, structurally similar web page, in order to extract data related to an item represented on the second web page. The item-related data that are extracted preferably include item-identifying data that can be used to identify the item represented on the second web page. The item-identifying data can include any data by which an item is represented on a web page, such as the name of an item. The item-identifying data can then be used to identify the item by matching it to an item within a database of item-identifying data.

In one embodiment, a client application executes on a user computer in conjunction with a web browser. The client application retrieves a rule from a data server based upon the URL of a web page loaded by the web browser. The client application then applies the rule to the web page to extract item-identifying data from the web page. The client application then provides the item-identifying data to the data server. The data server identifies the item by matching the item-identifying data to an item in a database. The data server retrieves supplemental information about the item from the database and supplies the supplemental information to the client application to be displayed on the user computer. The tasks of retrieving and applying the rule may alternatively be performed in-whole or in-part by a computing device other than an end user's computer, such as a special proxy server, the data server, or a computer system used to crawl and index web pages.

In one embodiment, the present invention is used to identify products on web pages of web-based retailers. Retail web sites generally use pages of similar structure to display items for sale. Accordingly, a rule is created based upon one web page of a retailer, and the rule is then applied to identify products on other pages hosted by the retailer. Once a product is identified, supplemental information about the identified product, such as alternative retailers from which the product can be purchased, can be provided to a user (e.g., as web page metadata).

In one embodiment, a data server is configured to crawl through a web site and apply rules to target pages in order to identify and catalog the representation of products on web pages. In addition, rules can be configured such that the extracted item-related data includes supplemental item information, such as the price of a product, in addition to the item-identifying data. The extracted supplemental item information can be stored in association with an identification of the item in a database. The stored supplemental item information can then be supplied to users, such as in response to subsequent requests for information about the item.

Item data extracted from web pages according to the invention may be used for a variety of other purposes. For example, the collected data may be used to build a database that can be queried by users to locate information about product offerings, auctions, job listings, apartment rentals, or other types of items.

DETAILED DESCRIPTION OF THE EMBODIMENTS

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices, components, and methods to those described herein. In other instances, well-known devices, components, and methods have not been described in detail so as not to unnecessarily obscure aspects of the present invention.

I. Overview

Figure 1:
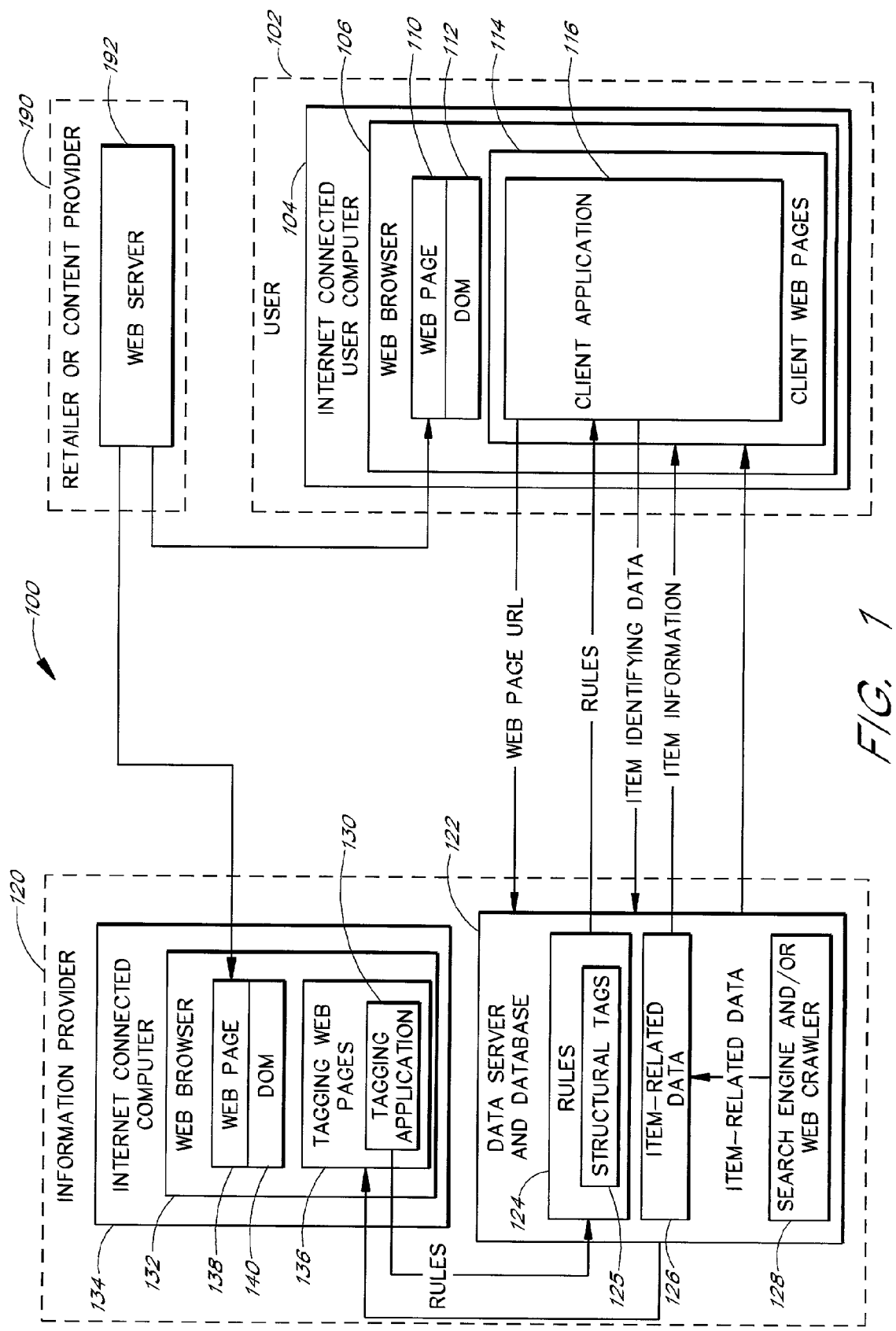
FIG. 1 illustrates a system in accordance with one embodiment of the present invention.

FIG. 1 illustrates a system 100 in accordance with one embodiment of the present invention. A user 102 browses the web through an Internet-connected computer 104 running a web browser 106. In browsing the web, the user 102 causes the web browser 106 to retrieve a web page 110 from a web server 192. The web server 192 may be operated, for example, by a retailer or a content provider 190.

Although web pages are typically coded in HTML, web pages may be created or coded using other formats. For example, a web page may be coded using XML, VoiceXML, or other markup languages.

Upon receiving the web page 110, the web browser 106 creates a structured graph representation 112 of the web page 110, such as the Document Object Model (DOM). Currently available web browsers 106, such as Netscape Navigator and Internet Explorer, are typically configured to create the structured graph representation 112 in order to allow a web page 110 to be dynamically manipulated by code, such as JavaScript, embedded in the web page itself.

An information provider 120 can be an organization or entity that provides supplemental information about items displayed on web pages. The information provider 120 preferably provides the supplemental item information through a set of client web pages 114 loaded and displayed by the web browser 106 on the user's computer 104.

A client application 116 preferably executes in conjunction with the web browser 106 on the user's computer 104 and communicates with a data server and database 122 operated by the information provider 120. The client application 116 preferably operates in conjunction with the data server and database 122 in order to identify items on web pages and provide supplemental information about identified items.

The data server and database 122 may be embodied as a combined unit on a single computer. Alternatively, the data server and database 122 may be implemented on one or more computers, which can be geographically remote from one another. The data server and database 122 is preferably also connected to and accessible via the Internet.

The functionality of the client application 116 can be incorporated in one or more of the client web pages 114 through embedded code such as JavaScript. The browser 106 loads a client web page 114 from the data server 122 in a new window or frame. When the client web page 114 is loaded, the embedded code is automatically executed. The client application 116 may additionally or alternatively be a plug-in or applet that runs within or alongside the web browser 106. In one embodiment, some or all of the functionality of the client application 116 can be incorporated into the web browser 106 itself as a standard feature.

The data server 122 maintains a database of rules 124. The database of rules 124 preferably stores a set of rules for each domain for which items are to be identified. Since the web pages within a single domain may have many different structures, many different rules may be included in the set of rules for a particular domain. The data server and database 122 may additionally or alternatively associate sets of rules with families of URLs to account for web sites that do not have their own domain names (e.g., home pages). A family of URLs may be specified by a domain plus an optional file path to a root directory.

Each rule can be applied by the client application 116 to extract item-related data from a web page having a certain structure. In one embodiment, each rule is made up of structural tags 125, each of which identify an element of item-related data. The extracted item-related data preferably include item-identifying data, which can be used to identify an item. The item-related data may also include supplemental item information, such as a price, which may be information related to the item, but need not necessarily serve to identify the item. Any supplemental item information that is extracted can be stored in the database 122 and provided when the same item is identified subsequently on another web page.

In one embodiment, the client application 116 identifies the URL of the target web page 110 loaded by the web browser 106 and relays the URL to the data server 122. The data server 122 identifies the domain associated with the supplied URL and returns a set of rules associated with the domain to the client application 116, preferably in a new client web page 114. The client application 116 applies the rules to extract item-related data, including item-identifying data, from the structural graph representation 112 of the web page. The client application 116 then supplies the extracted item-related data to the data server 122. The data server 122, in turn, receives the item-related data and attempts to match the included item-identifying data to an item.

In one embodiment, the data server and database 122 maintains item-related data 126. For each item, the item-related data 126 preferably include item-identifying data as well as supplemental item information. The database 122 identifies items by matching the received item-identifying data to item-identifying data in the database. For each item in the database, the item-identifying data may include, for example, an item name, a manufacturer, a product number, a UPC number, and/or the name of a commonly used image of the item. The supplemental information can be any information, such as a price, that the information provider 120 wants provide to the user through the client application 116. Other examples of supplemental item information include textual descriptions of items, customer reviews of items, images of the items, an indication of whether the item is offered for sale at another location, an indication of whether an item is in stock at another location, and an indication of the method by which the item is offered for sale (e.g., auction, outright) at another location.

In one embodiment described in Section V below, the database of item-related data 126 may be populated with data each time the client application applies a rule that extracts supplemental item information. Each time the data server 122 receives item-related data, the data server 122 can store any supplemental item information in the database in association with the item-identifying data. In addition or alternatively, the database of item-related data 126 may be populated using a search engine or a web crawler 128 in accordance with known techniques. Several techniques are known and used by shopping web sites (e.g., shopping.com) to locate multiple on-line retailers for a product and to identify retailers offering a product for the lowest price. In addition or alternatively, item-related data can be obtained in real time upon the request for information by the client application 116 by using a search engine. In addition or alternatively, item-related data can be obtained from existing databases, such as databases of product information that are maintained by many retailers. Information about items other than products (e.g., people, historical events, topics of interest) may be obtained from reference sources, web-based search engines, or other sources.

Once the data server 122 associates the received item-identifying data with an item, the data server returns a set of item information, preferably including supplemental item information, to the client application 116. The data server 122 preferably incorporates the item information into a client web page 114, which is provided to and displayed by the web browser 106. As will be recognized by one skilled in the art, any of a variety of other interface methods may be used to present the item information. For example, the original web page 110 could be supplemented with the item information or with links to such information. Examples of user interface methods that may be used for this purpose are described in U.S. Provisional Appl. No. 60/199,569, filed Apr. 25, 2000, the disclosure of which is hereby incorporated by reference.

In order to create rules 124, the information provider 120 preferably uses a rule creation and tagging application 130. In one embodiment, the rule creation and tagging application 130 is implemented through JavaScript embedded in a set of tagging web pages 136 that are displayed by a web browser 132 running on an Internet-connected computer 134. The rule creation application 130 may additionally or alternatively be a plug-in or applet that runs within or alongside the web browser 132. The term "tagging" will generally be used herein to refer to the process of creating rules by identifying nodes (which are defined by HTML or other tags) with the DOM or other object model of a web page.

The information provider 120 preferably assigns to a tagger (who may be an employee of the information provider) the task of tagging nodes and creating rules using the computer 134, the web browser 132, and the tagging application 130. The tagger loads the web browser 132 with a reference web page 138 containing an item. Upon receiving the reference web page 138, the web browser 132 creates a structured graph representation 140 of the reference web page 138. As will be discussed in additional detail below, the tagger uses the tagging application 130 to create rules by tagging item-identifying nodes within the loaded web page 138.

The information provider 120 may additionally or alternatively allow users 102 or other people to act as taggers and create rules. For example, the information provider 120 may allow users 102 to perform tagging. In one embodiment, an automated tool or program could be created and configured to create rules. The process of creating rules from the perspective of the tagger and the process of using rules from the perspective of the user will be discussed in the next section.

In one embodiment, the present invention is configured to apply rules to identify items (typically products) offered for sale within web pages. Once a product has been identified, an information provider provides supplemental information about the product to a user browsing the web page. The supplemental information may be alternative locations, preferably with corresponding prices, from which the item may be purchased. In other embodiments, the identified item need not be a product offered for sale and may be any identifiable thing that can be presented or represented on a web page (e.g, a person, an event, or a place). The supplemental information provided about the item may be any information that the provider of the information wants to provide.

II. User Interfaces

Figure 2:
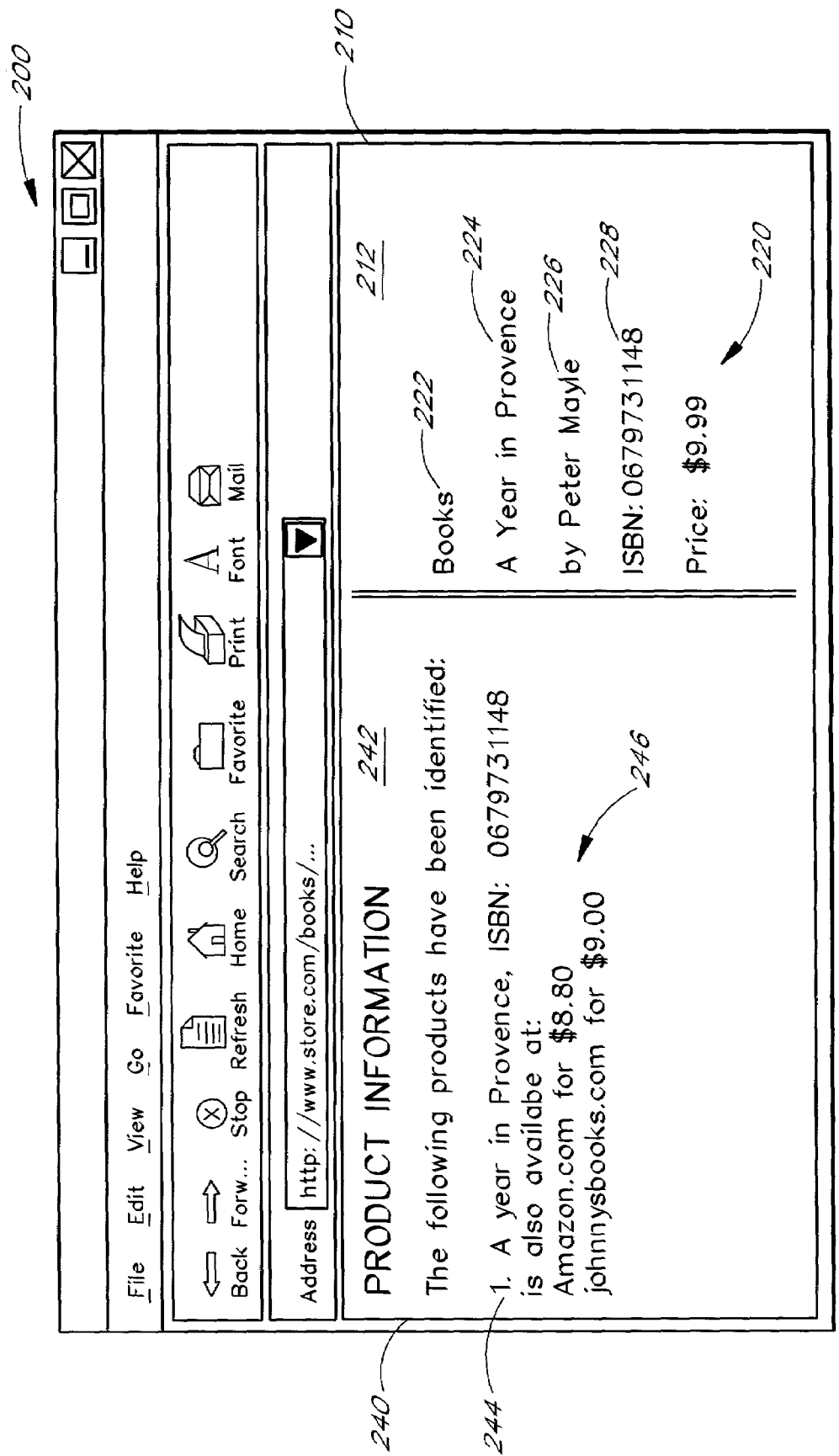
FIG. 2 illustrates a web browser user interface as it would be viewed by a user in accordance with one embodiment of the present invention.
Figure 3:
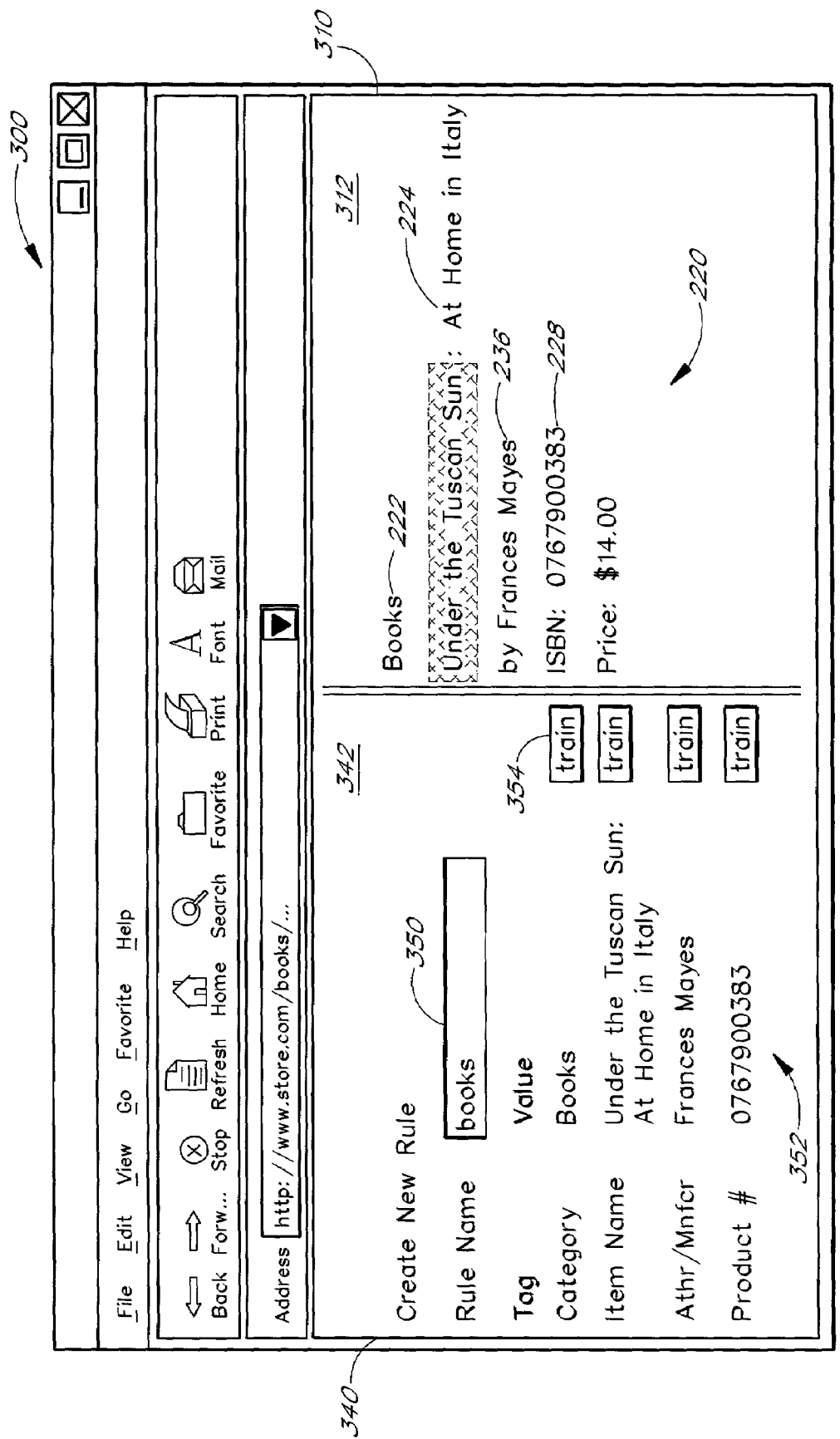
FIG. 3 illustrates an example web browser user interface as it would be viewed by a tagger (person creating rules) in accordance with one embodiment of the invention.

FIGS. 2 and 3 illustrate, from the user's perspective, the example application and creation, respectively, of a rule that identifies books on certain web pages located within a certain domain (e.g., store.com). The web page 212 illustrated in FIG. 2 is similar (possibly identical) in its layout and structure to the web page 312 of FIG. 3. The only difference between the two pages may be the information that is displayed in each of the corresponding locations on each of the respective pages 212 and 312. FIGS. 2–3 are discussed in additional detail below.

A. End User's Perspective

FIG. 2 illustrates a web browser user interface 200 as it would be viewed by a user in accordance with one embodiment of the present invention. The user interface 200 includes a main window 210, which displays a target web page 212 upon which an item is offered for sale or otherwise presented. The web page 212 includes one or more elements 220 of identifying data by which the item can be identified. These elements 220 may include, for example: a category 222 (e.g., Books), a name 224 (e.g., "A Year in Provence"), an Author or Manufacturer 226 (e.g., Peter Mayle), and a Product Number or ISBN 228 (e.g., 0679731148). The target web page 210 is located at a domain 230 (e.g., store.com), which may be operated by an on-line retailer 190 (FIG. 1).

The web browser user interface 200 also includes a client web page 242, which is preferably loaded by the client application 116 into a client sidebar 240. The sidebar 240 may be another window displayed alongside of the main browser window 210. The client web page 242 provides an identification 244 of one or more items presented on the target web page 210 and presents supplemental information 246 about the identified item or items. In the illustrated example, the client web page 242 is titled "PRODUCT INFORMATION" since the information provider 120 in the present example generally supplies supplemental information about products offered for sale. In accordance with this embodiment, the information provider 120 may be an entity that accumulates and provides supplemental information about products offered for sale on-line. In the illustrated example, the information provider 120 has identified the item named "A Year in Provence" on the target web page 210 and has identified two alternative locations from which the item can be purchased along with the associated prices.

B. Tagger's Perspective

FIG. 3 illustrates an example web browser user interface 300 as it would be viewed by a tagger (person creating a rule) in accordance with one embodiment of the invention. The user interface 300 includes a main browser window 310, which displays a reference web page 312. The reference web page 312 based upon which this rule is created is similar in structure to the web page 210 to which the created rule is applied. The only difference between the example pages illustrated FIGS. 2 and 3 is that some of the elements 220 that identify the two items are different. On the web page 312 in FIG. 3, the name 224 of the item is "Under the Tuscan Sun: At Home in Italy," the Author or Manufacturer 226 is Frances Mayes, and the Product Number or ISBN 228 is 0767900383. The web page 312 of FIG. 3, however, has the same domain 230 (store.com) and category 222 (Books) as the web page 210 of FIG. 2.

In order for a rule to be successfully applied, the HTML structure (and structured graph representation) of the reference web page 312 based upon which the rule is created should be similar to the HTML structure (and structured graph representation) of the web page 210 to which the rule is applied. A rule may still be successfully applied, however, even if there are differences between the structures of the pages, since certain structural differences may not affect application of the rule. If a rule is applied to a web page with a substantially different structure, the application of the rule may fail.

The tagger's web browser user interface 300 includes a rule creation (tagging) web page 342, which is loaded by the rule creation and tagging application 130 into a rule creation sidebar 340. The sidebar 340 can be an additional frame or window displayed by the web browser 132. The rule creation web page 342 provides an interface (e.g., titled "Create New Rule") through which rules can be created. The rule creation web page 342 preferably also includes the code of the tagging application 130, which is executed by the web browser when the page 342 is loaded. The rule creation web page 342 and tagging application 130 allow the tagger to interactively use the reference web page 312 in the main browser window 310 as a template for creating the new rule. As illustrated in FIG. 3, the rule creation web page 342 can include a text box 350 into which the tagger can type a rule name, for example, "books."

III. Structural Tags

In accordance with one embodiment, each rule is made up of a set of components, called structural tags. Each structural tag identifies a tagged element within the structured graph representation (Document Object Model or DOM) of a web page. The rule creation web page 342 (FIG. 3) provides a table 352 through which structural tags can be configured. A basic structural tag preferably includes four properties including: a Name, a Path, an Attribute, and a Required Flag.

The Name property of a structural tag can be used to indicate the type of information represented by the tagged element. In the example rule creation web page 342 (FIG. 3), there are four structural tags named Category, Item Name, Author/Manufacturer, and Product Number.

The Path property of a structural tag can be thought of as a sequence of turns to take to traverse from a known reference point in the structured graph representation or DOM to the node containing the tagged element. In one embodiment, the traversal begins at the top-level document (e.g., the root of a tree in a structural graph representation) and proceeds by traversing to the specified child of each node as specified by the Path until the tagged node is reached. The path may also reference any named nodes if any nodes along the path have names, in traversing to the tagged node.

In order to set the path property of a structural tag, the tagger highlights or selects some data in the reference web page 312. In FIG. 3, the tagger has highlighted "Under the Tuscan Sun" in the web page 312 as shown. The tagger then selects the "train" button 354 next to the name of the structural tag. In response, the Javascript of the rule creation web page 342 identifies the node within the DOM of the web page 312 containing the selected data and creates a path leading to the node.

The Attribute property of a structural tag is a DOM identifier that is used to obtain the element of interest from the tagged node. Attributes may be, for example, innerText, nodeValue, src, or title. In one embodiment, the Attribute of a structural tag is also determined automatically by the rule creation web page 342 when the path is created.

Since a path may not have any meaning to a tagger, the element located at a node (the Value in FIG. 3), rather than the path to the node, is presented to the tagger in the table of structural tags 352. In this manner, the tagger can verify the path to the node by the verifying the Value of the identified node which represents the extracted element. In FIG. 3, the tagger has selected the text: "Under the Tuscan Sun: At Home in Italy." In response, the rule creation web page 342 identifies the node containing the selected text and automatically creates a path to this node. The page 342 then extracts the data from this node and displays the data next to the Item Name so that the tagger can verify that the correct node was identified.

When the rule containing the structural tag is applied, the path to the identified node is used to obtain the data at a corresponding node in a structurally similar web page. A structural tag "hits" when the Path returns a single tagged node and the Attribute of the tagged node yields data that is not blank. In the case a target web page has a different structure than the reference web page based upon which the rule was created, one or more nodes in the Path may not be present and the structural tag may not hit. In addition, the tagged node may contain no data in which case the structural tag will not hit.

The Required Flag property is used to indicate whether a particular structural tag must "hit" in order for the rule to succeed. In one embodiment, the Required Flag is set by the tagger using a pop up window associated with the structural tag.

The structural tags named Item Name, Author/Manufacturer, and Product Number in the rule creation web page 342 of FIG. 3 are basic structural tags. The Category structural tag of FIG. 3, however, is a matching structural tag, which is configured to identify a node having a particular value.

A matching structural tag includes two additional properties called Matchtext and Matchvalue. The Matchtext property defines a value that is expected to be found at the tagged node. When a rule applies a matching structural tag, the rule first determines whether the Attribute (tagged element) of the tagged node yields a value, like a basic structural tag. If a value is found, the value is then compared to the Matchtext property. If the value matches the Matchtext, then the matching structural tag hits. If the matching structural tag hits, the Matchvalue is returned as the value of the tag.

The MatchValue of a matching structural tag may be the same as the Matchtext or it may be different. For example, the information provider may wish to categorize all books using a lower case identifier by setting the Matchvalue to "books." Alternatively, the Matchtext may be "Books" but the information provider may wish to categorize books together with music and therefore the corresponding Matchvalue may be a text string "books and music." In one embodiment, the Matchtext and Matchvalue properties may each have multiple corresponding values. The multiple Matchtext and Matchvalue values can be stored in a two-dimensional array. If any of the Matchtext values match, then the corresponding Matchvalue can be returned.

In one embodiment, regular expressions or other types of matching can be supported by the MatchText property. Regular expressions increase the power and flexibility of a text matching tag.

The rule creation web page 342 can be configured such that the properties of each structural tag can be set using a pop up window. The pop up window might be brought up automatically after the train button 358 is selected. Various alternative implementations are possible as will be recognized by one skilled in the art.

In one embodiment, the number of structural tags in a rule and certain properties of the structural tags are determined in advance of the tagging process. For example, the data server 122 can be configured to identify items based upon certain item-identifying data. The number and names of the structural tags can be configured in advance to conform to and supply the data based upon which the server 122 identifies items.

Once the tagger sets all of the properties of the structural tags for a rule, the rule is complete. In order to verify that a rule is working properly, the tagger can drive the main browser window 310 to another page that appears to have a similar structure. The rule creation application 130 can be configured to apply the newly created rule to the other web page such that the value associated with each element is displayed in the table of values. The tagger can then confirm that the rule correctly extracted the desired elements from the new web page.

IV. Methods

A. Rule Creation

Figure 4:
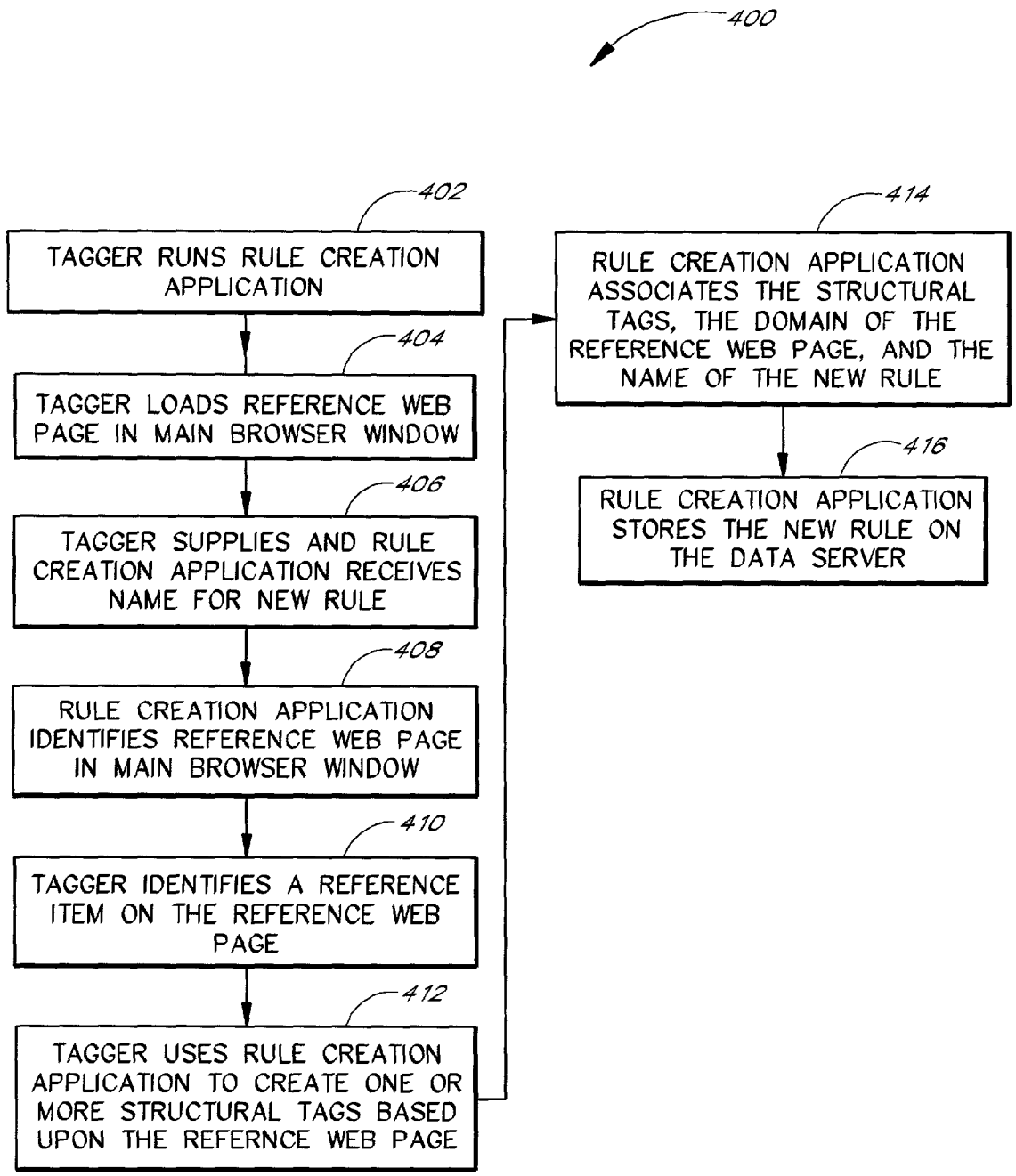
FIG. 4 illustrates a general method for creating rules in accordance with one embodiment of the present invention.

FIG. 4 illustrates a general method 400 for creating rules in accordance with one embodiment of the present invention.

At a step 402, a tagger runs a rule creation application 130. In one embodiment, the tagger loads a tagging web page 136 into the web browser 132. The tagging web page 136 preferably contains the code (e.g., JavaScript or other code) of the rule creation application 130, which is then executed by the web browser 132. In one embodiment, the code of the rule creation application 130 is included in a sequence of tagging web pages 136, each of which provides the code of a portion of the tagging application 130.

The file alxpath.js in the Computer Program Listing Appendix includes code that provides rule creation functionality in accordance with one embodiment of the invention. Some of the functions referenced in the file alxpath.js, however, are found in the file alxstag_client.js, which includes code for a corresponding client application 116.

At a step 404, the tagger loads a reference web page 312 into a main web browser window 310. The reference web page is used by the tagger and the rule creation application as a reference based upon which to create a rule. In one embodiment, the step 404 may be performed before the step 402.

At a step 406, the tagger supplies and the rule creation application receives a name for a new rule. The name can be used to keep track of and identify the new rule.

At a step 408, the rule creation application identifies the reference web page in the main browser window. In one embodiment, the rule creation application can identify the reference web page by obtaining a handle to the DOM of the web page and obtaining the URL of the reference web page.

At a step 410, the tagger identifies a reference item on the reference web page 312. The tagger can identify the reference item by observing one or more elements 220 of item-identifying data. The reference item is preferably an item that is prominently displayed so that other pages with a similar structure will also contain other items in structurally similar locations.

At a step 412, the tagger uses the rule creation application to interactively create one or more structural tags based upon the reference item on the reference web page 312. The rule creation application can be pre-configured to prompt the tagger to create a number of structural tags. In the example of FIG. 3, the page is configured to allow the tagger to create four structural tags named Category, Item Name, Author/Manufacturer, and Product Number. The process of creating structural tags will be described in additional detail below with reference to FIG. 5.

At a step 414, the rule creation application associates the structural tags, the domain of the reference web page, and the name of the new rule. In one embodiment, the rule creation application encodes the new rule as an XML (Extensible Markup Language) document that contains definitions of the structural tags, the domain name, and the name of the rule. Accordingly, the new rule can be catalogued by domain name and the name of the rule.

At a step 416, the rule creation application stores the new rule on the data server 122. In one embodiment, the rule creation application 130 forwards the document to the data server 122 for storage in a database.

B. Structural Tag Creation

Figure 5:
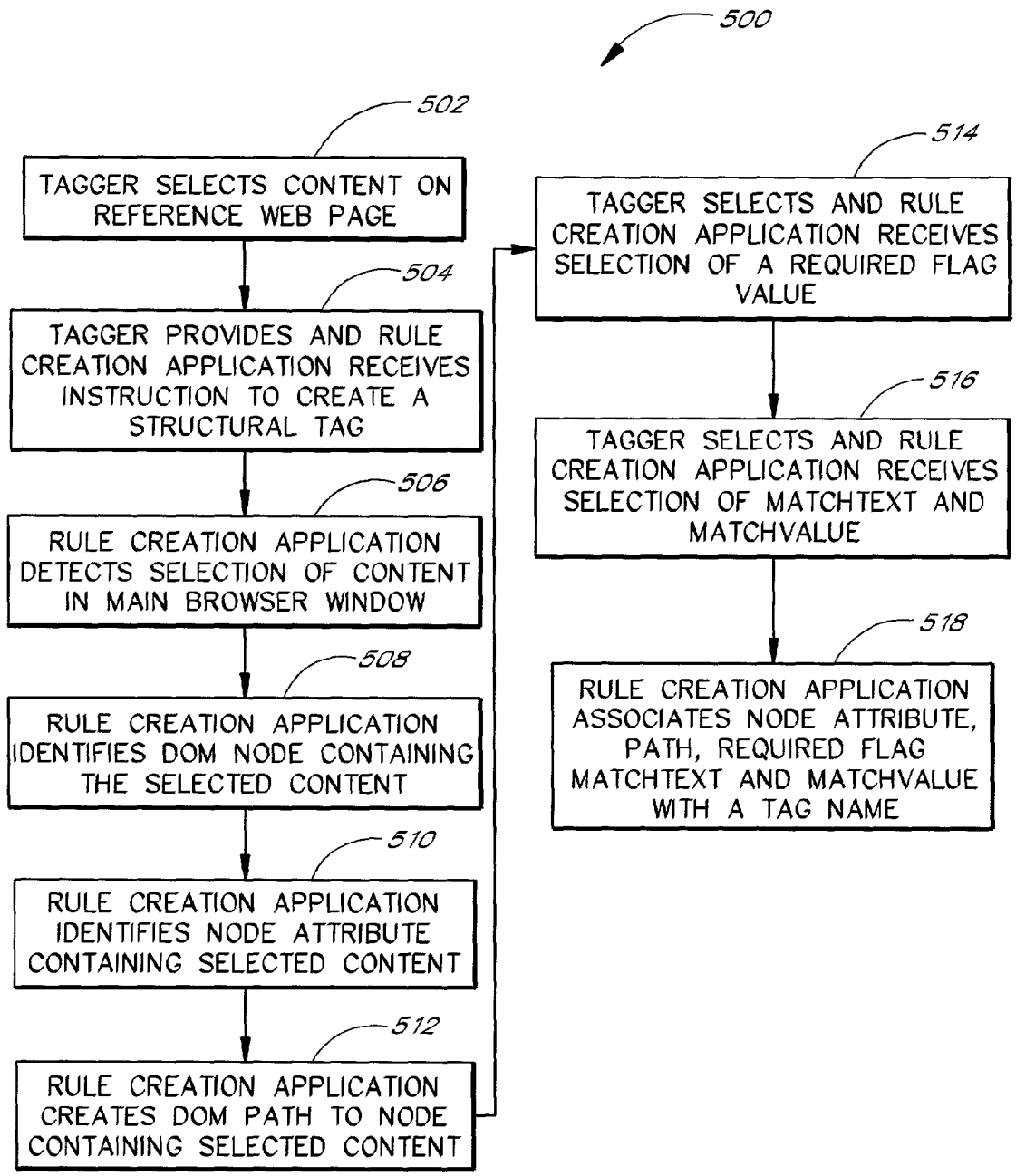
FIG. 5 illustrates a method through which structural tags are created in accordance with one embodiment of the invention.

FIG. 5 illustrates a method 500 through which structural tags are created in accordance with one embodiment of the invention that uses the Document Object Model of a web page. The method 500 represents one embodiment of the step 410 of the method 400.

At a step 502, the tagger selects some content or data on the reference web page 312. The content should serve to identify the reference item and should match the name of the structural tag being created. For example, if the name of the structural tag is "Item Name" then the selected content should be the name of the reference item on the reference web page.

At a step 504, the tagger provides and the rule creation application 130 receives an instruction to create a structural tag. In one embodiment, the tagger clicks a "train" button 354 (FIG. 3), which is detected by the rule creation application. At a step 506, the rule creation application detects the selection of some content in the main browser window.

At a step 508, the rule creation application identifies the DOM node containing the selected content. At a step 510, the rule creation application identifies a node attribute of the identified DOM node that contains the selected content. At a step 512, the rule creation application creates a structured graph representation (DOM) path to the node containing the selected content. Code configured to perform the steps 508, 510, and 512 in accordance with the preferred embodiment is included in the Computer Program Listing Appendix.

The format of the DOM path is determined by the particular implementation and should be configured to be read by a compatible client web page 114. In one embodiment, the DOM path is represented by a comma-separated list of types of nodes and indices. For example, a path may be defined as "t,1,t,2,0,1" where the letter "t" denotes a table, and where children are identified by a zero-based index for each node. This example path will instruct a compatible client web page to start at the top level of the DOM, to traverse through the top node's children to the second table (denoted by the 0-based index "1"), then to traverse through this node's children to the third table (denoted by the 0-based index "2"), then to traverse through this node's children to the 1st child, and then to traverse through this node's children to the second child.

At a step 514, the tagger selects and the rule creation application receives selection of a Required Flag value. The Required Flag indicates whether this structural tag must hit in order for the rule containing the structural tag to succeed. At an optional step 516, the tagger selects and the rule creation application receives selection of a Matchtext value and a Matchvalue value. The Required flag, the Matchtext, and the Matchvalue may be entered by the tagger through a pop up window or any other user input mechanism.

At a step 518, the rule creation application associates the node attribute, the path, the Required Flag, the Matchtext, the Matchvalue, and the tag name. In one embodiment, these variables are stored in association with each other in an XML document.

C. General Rule Application

Figure 6:
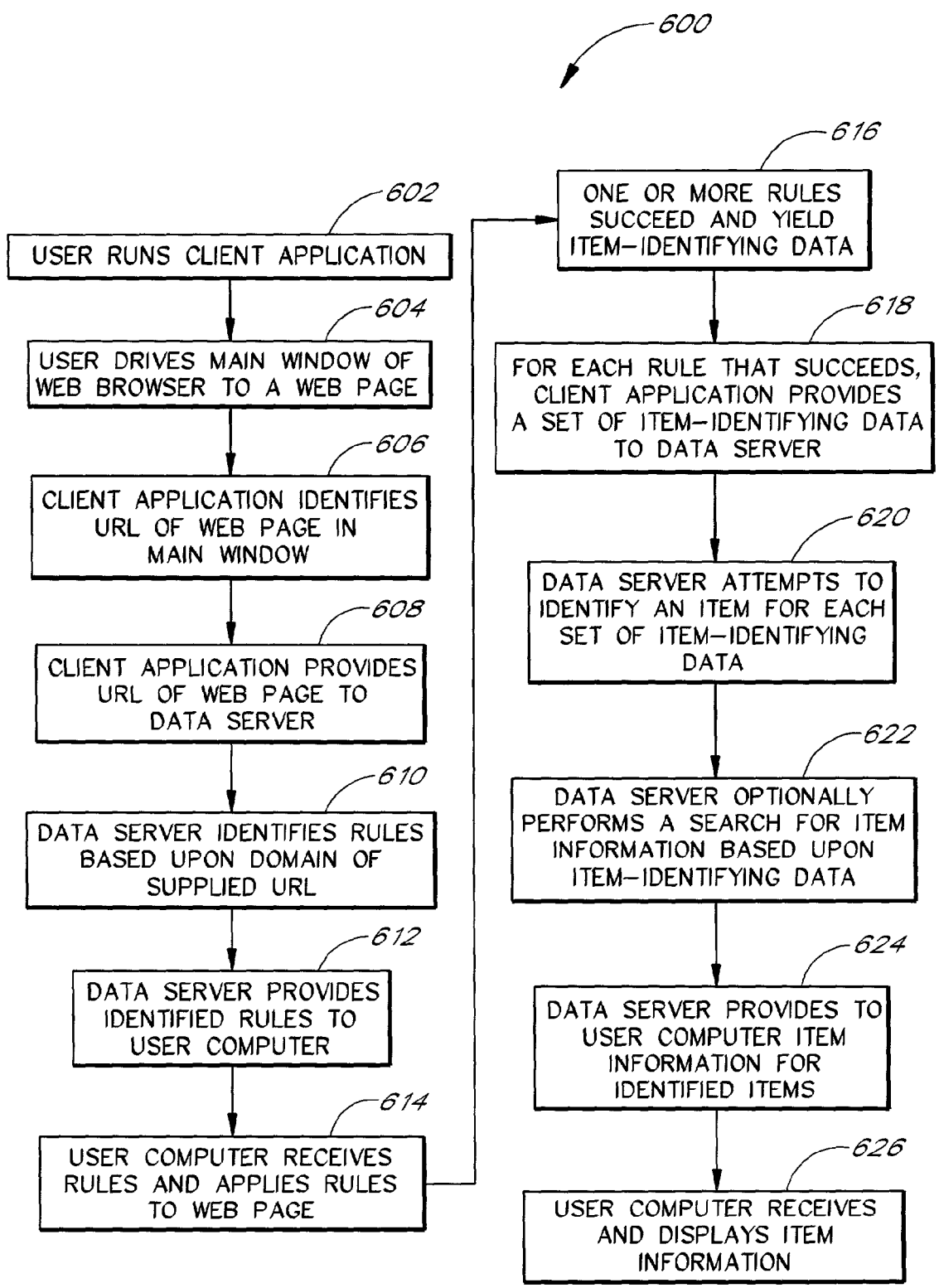
FIG. 6 illustrates a method through which rules are applied to provide information about items in accordance with one embodiment of the invention.

FIG. 6 illustrates a method 600 through which rules are applied to provide information about items in accordance with one embodiment of the invention.

At a step 602, the user runs a client application 116 in conjunction with a web browser 106. In one embodiment, the user loads a client web page 114 into the web browser 106. The client web page 114 preferably contains the code (e.g., JavaScript or other code) of the client application 116 that is executed by the web browser 132. Alternatively, the web browser 106 can be configured to automatically load the client web page 114 in a separate window or sidebar. The client application 116 can be configured to be automatically loaded each time the user executes the web browser 106. The file alxstag_client.js in the Computer Program Listing Appendix includes code that provides the client application functionality in accordance with one embodiment of the invention.

At a step 604, the user drives the main window of the web browser to a target web page 210. The step 604 can be performed before the step 602.

At a step 606, the client application identifies the URL of the target web page 210 in the main window 210 of the web browser 106. In one embodiment, the client application can identify the target web page by obtaining a handle to the DOM of the web page and obtaining the URL of the target web page.

At a step 608, the client application provides the URL of the target web page to the data server 122. In response, at a step 610, the data server identifies rules based upon the domain of the supplied URL. The server may alternatively or additionally look up a rule based upon a URL family in the case that it appears a web site is a home page or does not have its own domain name.

At a step 612, the data server 122 provides the identified rules to the user computer 104. In one embodiment, the rules can be embedded as additional code within the client application in a new client web page 114. The new client web page 114 is loaded by the web browser 106 and the rules are applied by executing the code embedded in the web page 114. In another embodiment, the rules are provided in an XML document that is received by the client application.

At a step 614, the user computer 104 receives the rules and applies the rules to the target web page 210. In one embodiment, the web browser 106 executes the additional client application code embedded in a new client web page 114 received from the data server 122. Alternatively, the client application can receive the rules (e.g., in an XML document) and apply the rules. At a step 616, one or more rules succeed and yield item-identifying data. At a step 618, for each rule that succeeds, the client application provides a set of item-identifying data to the data server 122. The process of applying rules, determining success, and providing item-identifying data will be described in additional detail below with reference to FIGS. 7 and 8.

At a step 620, the data server 122 attempts to identify an item for each set of received item-identifying data. In one embodiment, the data server searches a database of items based upon the item-identifying data. The database preferably indexes items based upon item-identifying data and includes additional information on each item.

At a step 622, the data server 122 optionally performs a search for item information based upon the supplied item-identifying data. The data server 122 may search on the World Wide Web using a search engine or through other sources for information.

At a step 624, the data server 122 provides item information for identified items to the user computer 104. At a step 626, the user computer 104 receives and displays the item information. In one embodiment, the data server 122 provides the item information in the form of a new client web page 114 to be displayed by the web browser 106. The new client web page can be configured to display the item information and may also include additional client application code to initiate the method 600 again.

D. Rule Application

Figure 7:
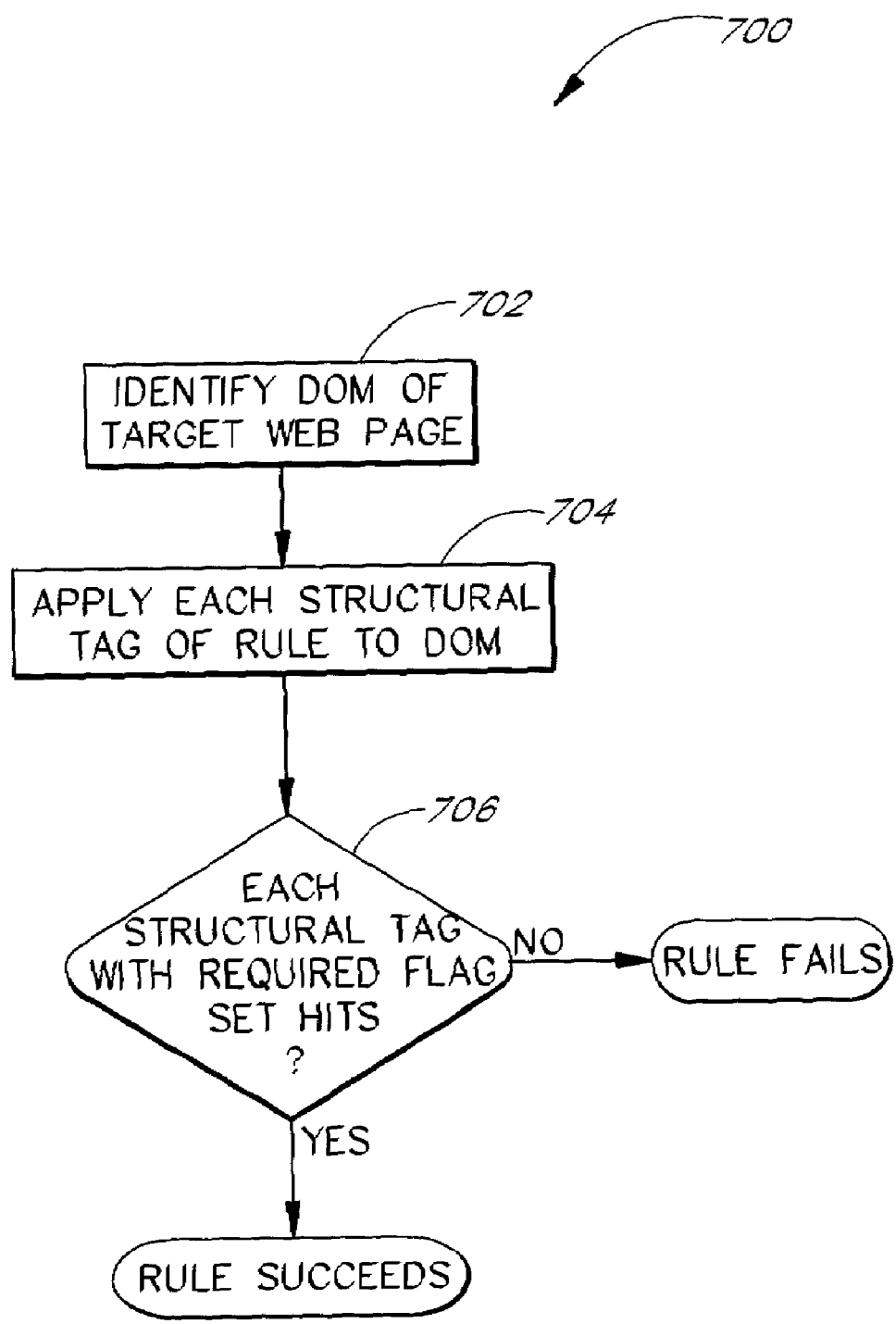
FIG. 7 illustrates a method through which a rule is applied in accordance with one embodiment of the invention.

FIG. 7 illustrates a method 700 through which a rule is applied in accordance with one embodiment of the invention.

At a step 702, the client application 116 identifies the DOM of the target web page 210. At a step 704, the client application applies each structural tag of a rule to the DOM of the target web page. The process of applying structural tags will be described in additional detail below with reference to FIG. 8.

At a decision step 706, the client application determines whether each structural tag having its required flag set has hit. If each structural tag with its required flag set hits, the rule succeeds. On the other hand, if one or more of the structural tags with their required flags set does not hit, then the rule fails.

E. Structural Tag Application and DOM Traversal

Figure 8:
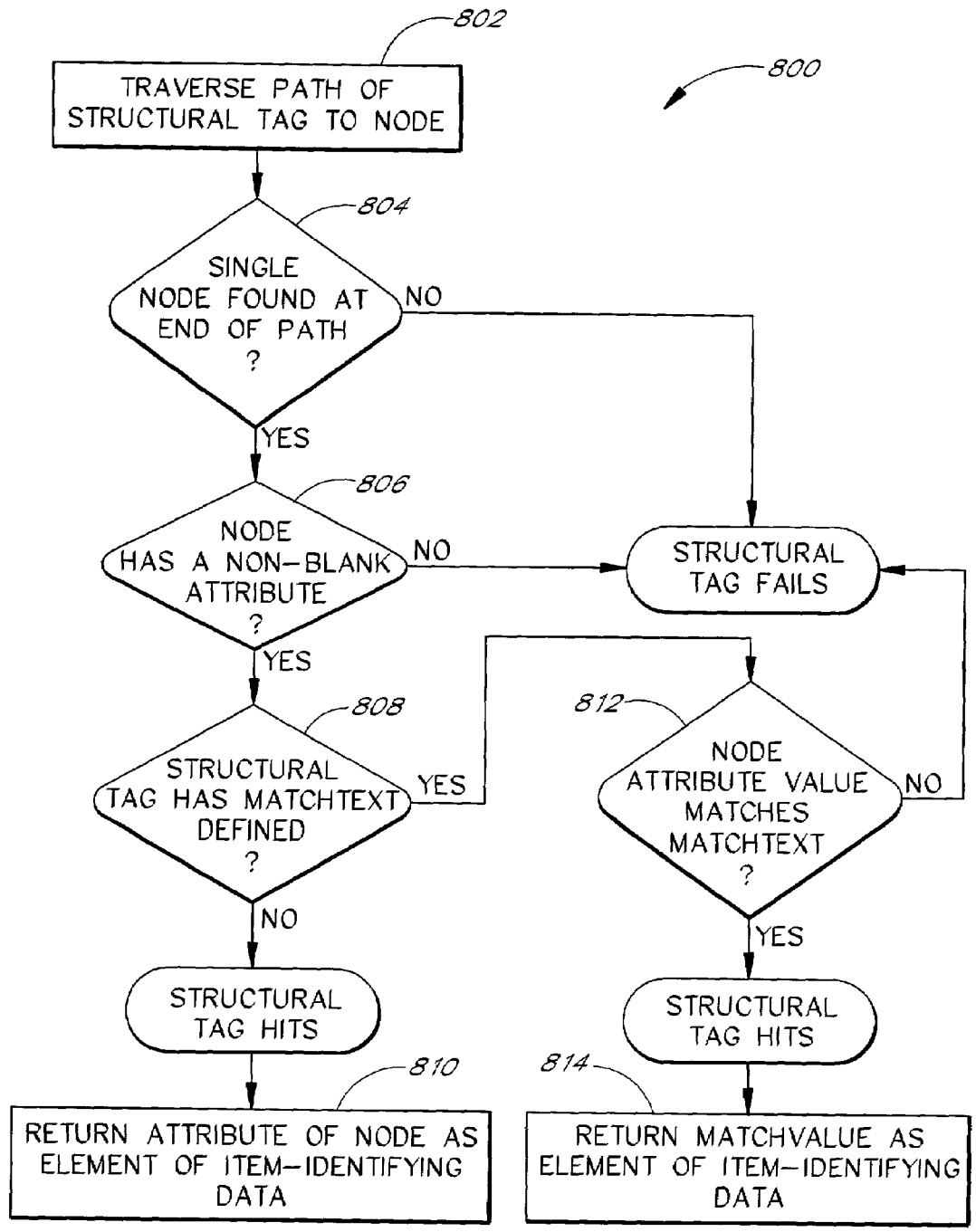
FIG. 8 illustrates a method through which a structural tag is applied in accordance with one embodiment of the invention.

FIG. 8 illustrates a method 800 through which a structural tag is applied in accordance with one embodiment of the invention.

At a step 802, the client application 116 traverses the DOM path specified by the structural tag to a node. In one embodiment, a Javascript function takes the DOM path in a string format, begins at the document level of the DOM, and traverses through the DOM structure to the node specified by the path.

At a step 804, the client application determines whether a single node exists at the end of the specified DOM path. If a single node is not found, the application of the structural tag fails, and the method 800 ends. On the other hand, if a single node is found, the method proceeds to a step 806.

At the step 806, the client application determines whether the single node at the end of the DOM path has a non-blank attribute that is specified by the structural tag. If the node does not have a non-blank attribute, then the structural tag fails and the method 800 ends. On the other hand, if the node does have a non-blank attribute, and the method proceeds to a step 808.

At the step 808, the client application determines whether the Matchtext property has been defined/set. If the Matchtext property is not set, the structural tag is not a matching structural tag and no further analysis is necessary. Therefore, the tag hits and the method proceeds to a step 810.

At the step 810, the client application returns the attribute of the node as an element of item-identifying data. In one embodiment, the element of data is then assembled with other data elements obtained from other structural tags. The elements of item-identifying data are then transmitted to the data server 122 in accordance with the steps 616 et. seq. of the method 600.

Returning to the step 808, if the Matchtext property is set, the structural tag is a matching structural tag and the method proceeds to a step 812. At the step 812, the client application determines whether the node attribute value matches the Matchtext. If so, the matching structural tag hits and the method proceeds to a step 814. At the step 814, the client application returns the Matchvalue as the element of item-identifying data in a manner similar to the step 810.

V. Data Acquisition

In accordance with one embodiment, item-related data that is supplied by the client application 116 is used to populate the database of item-related data 126. Each time the data server 122 receives item-related data from the client application, the data server updates the database of item-related data 126 to include the newly received item-related data.

In one configuration, a structural tag configured to extract a price is added to a rule configured to identify products on a retail web site. Each time the rule is successfully applied by a client application, the rule retrieves the price of an item in addition to other item-identifying data, such as the title, author, or ISBN of a book. The price is then returned to the data server in conjunction with the other item-related data and stored in the database.

For each item, the price of the item shown at a particular URL or domain can be associated with that URL or domain in the database. The URL or domain information is preferably sent to the data server 122 in the initial request for a rule by the client application. The URL or domain information may, however, also be included with the item-identifying data supplied by the client application to the data server.

As the database is populated with associations of item-identifying data, URLs, and prices, this information can be provided in response to subsequent requests for supplemental product information about the same item. In alternative configurations, data about items other than products may be collected or data other than price information may be collected.

Figure 9:
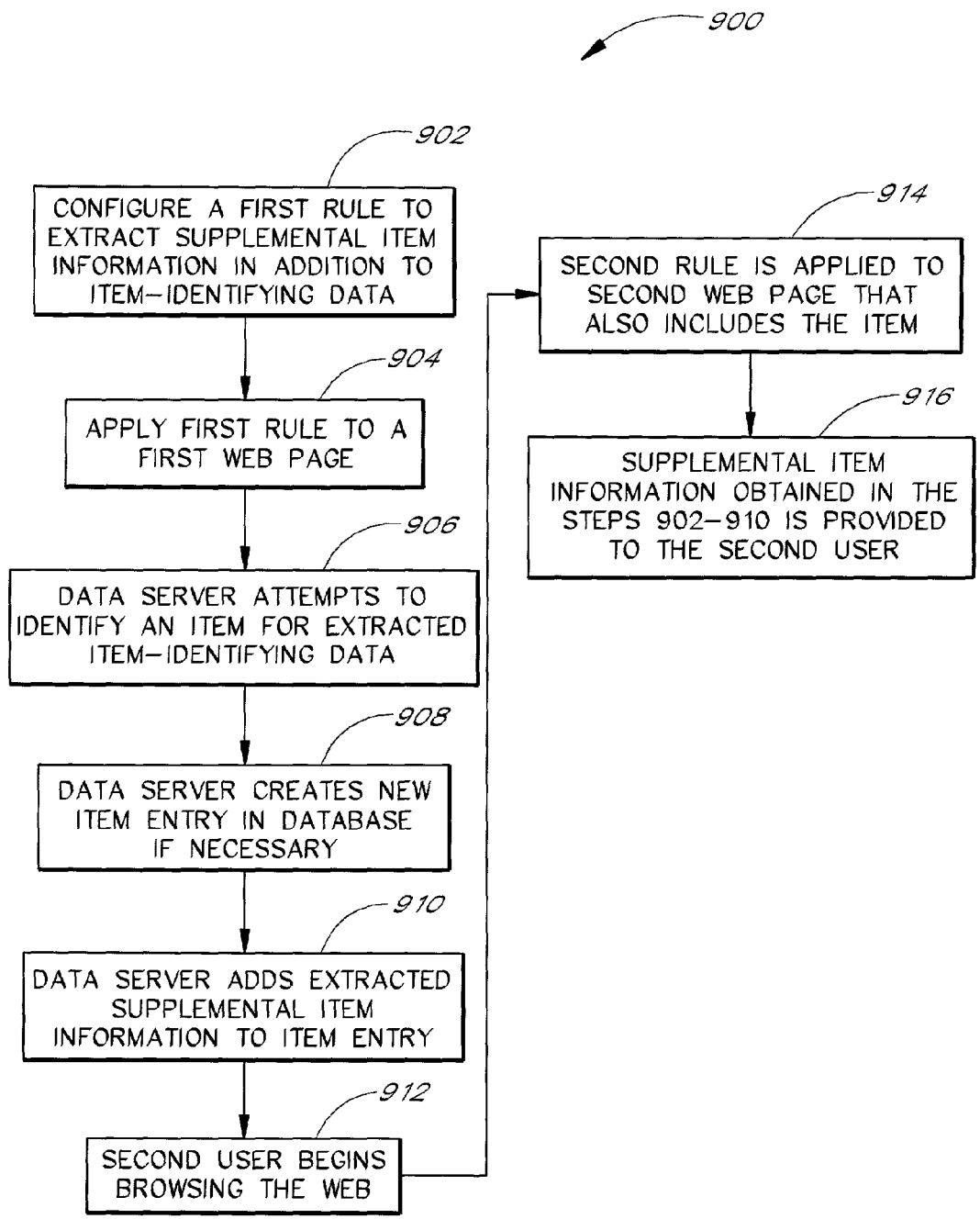
FIG. 9 illustrates a method in accordance with which information about an item can be collected and then redistributed as supplemental item information.

FIG. 9 illustrates a method 900 in accordance with which information about an item can be collected and then redistributed as supplemental item information.

At a step 902, a first rule is configured to extract item-related data including supplemental item information and item-identifying data, from a target web page within a domain or web site. For example, the rule can be configured to include a structural tag has a DOM path to the price of an item. Although the price would not ordinarily be used to identify an item, the price of the item is valuable information that can be subsequently supplied as supplemental item information.

At a step 904, the first rule is supplied by the data server and applied to a first web page being browsed by a first user in accordance with the steps 602 through 620 of the method 600.

At a step 906, the data server attempts to identify an item in the database that matches the supplied item-identifying data. The step 906 may be included in the step 620 of the method 600.

At a step 908, it may be the case that the data server is not able to identify an item in its database based upon the item-identifying data supplied by the client application. In this case, the data server can create a new entry in the database for the item and store the received item-identifying data in the entry. The data server, in this case, might not return any supplemental item information to the client application and no information will be provided to the user. Alternatively, the data server may return a client web page 114 indicating that no information is available. Alternatively, the client web page may provide other, possibly general, information about the web site being browsed without referring to any particular item or items on the web page being browsed.

At a step 910, the data server stores the supplemental item information received from the client application in association with the item in the database. For example, if the item is a book, the URL of the web page on which the book was identified and the price of the book may be stored together and in association with an entry for the book in the database.

At a step 912, a second user begins browsing the web. At a step 914, a second rule, which can be different than the first rule, is applied to a second web page, which can be different than the first web page, but includes the same item that was referenced in the steps 902 through 910. The second rule can be applied in accordance with the steps 602 through 622 of the method 600.

At a step 916, the server supplies supplemental item information including the supplemental item information stored in the step 910. The step 916 can be performed in accordance with the steps 624 and 626 of the method 600. For example, the next time the book of step 910 is identified on another web page, the supplemental item information provided by the data server can include the URL of the previously identified web page and the previously identified price. The user receiving this information can then follow the link to the identified web page to shop for the book at an alternative location.

Rules can be created for non-retail web sites that list products that are sold by retail web sites. For example, a product manufacturer may list products it manufactures but may not offer the products for sale. As the rules are applied at the non-retail web sites, the accumulated supplemental information can be used to direct users to retail web sites that sell the displayed products. Accordingly, once a rule is successfully created, the work of populating a database by using the rule can be left up to the users of the system. In many instances, such as when no supplemental information is yet available in the database for an item, the populating of the database as a result of a supplied rule can be made completely transparent to a user of the system.

VI. Alternative and Additional Embodiments

In the embodiments already described, the data server 122 provides rules to the user computer 104 and the user computer applies the rules to identify items on web pages. Alternatively, the data server can be configured to apply the rules to identify items on accessed pages.

In the embodiments illustrated in FIGS. 7 and 8, the methods 700 and 800 are performed by the client application 116. In one alternative embodiment, the data server 122 can be configured to fetch the same target web page 210 displayed by the user's web browser 106 after the client application 116 supplies the URL of the page 210. The data server 122 can then dynamically apply the rules to the fetched web page in accordance with the methods 700 and 800, locate the identifying data based upon the rules 124, and identify an item. Once the item has been identified, the data server 122 can return item information to the user computer 104. Accordingly, only two data transfers between the server 122 and the user computer 104 are needed instead of four. In this embodiment, however, the data server 122 must fetch the same web page that has already been fetched by the user's web browser 106. In another embodiment, the client application 116 can be configured to forward the complete target web page 210 to the data server 122 so that the data server need not fetch the web page.

In one embodiment, the user computer 104 can be configured to communicate with a proxy server that retrieves rules from the data server, applies rules to web pages, retrieves item information from the data server, and forwards the item information to the user computer. The proxy server may be configured to augment web pages requested by the user computer with supplemental item information, and to forward the augmented web pages to the user computer. As will be understood by one skilled in the art, the steps of the disclosed methods may alternatively be performed by means, code, programs, devices, or people other than those disclosed herein.

In one embodiment, the data server 122 can be configured to crawl some or all of the pages of a web site to populate a database with URLs and corresponding items represented on the pages identified by the URLs. The data server 122 can be configured to crawl through a web site after a tagger creates a rule for a page of the web site. In addition, the data server 122 can be configured to crawl through the web site periodically after the initial crawl to search for items on additional web pages or changed web pages. As the database is populated with associations of URLs and items, these associations become available to client applications 116 requesting information about URLs. The data server 122 can also combine the URL-item associations with item-supplemental information associations. Therefore, the data server 122 can receive a reference to a URL and in exchange provide supplemental information about an item represented on the web page located at the URL. In accordance with this embodiment, the client application 116 can transmit the URL of a displayed web page 210 to the data server 122 and in direct response, the data server can return a new client web page 114 containing supplemental item information.

VII. CONCLUSION

Although the invention has been described in terms of certain preferred embodiments, other embodiments that will be apparent to those of ordinary skill in the art, including embodiments which do not provide all of the features and advantages set forth herein, are also within the scope of this invention. Accordingly, the scope of the invention is defined by the claims that follow. In method claims, reference characters are used for convenience of description only, and do not indicate a particular order for performing a method.

What is claimed is:

1. A method of identifying an item represented on a web page retrieved by a client computer, the method comprising, on the client computer:

sending a request to a server, wherein the request specifies at least a portion of an electronic address from which the web page was retrieved;

receiving a rule in response to the request, wherein the rule is associated with a plurality of web pages that share a common web page structure, and is capable of using the common web page structure to extract information from said web pages;

applying the rule to the web page, wherein applying the rule comprises, on the client computer, traversing a structural graph representation of the web page, according to a path specified by the rule, to obtain access to a node of the structural graph representation;

extracting from the web page, based at least upon access to the node, item-identifying data descriptive of the item represented on the web page;

using the item-identifying data extracted from the web page to retrieve, over a network, supplemental information about the item; and displaying said supplemental information on the client computer in conjunction with a display of the web page; and wherein the supplemental information comprises information previously extracted from a second web page via application of a second rule to the second web page, said second web page including information about said item.

2. The method of claim 1, wherein applying the rule to the web page comprises evaluating whether the rule is successful, at least in part, by determining whether the path leads to a single node.

3. The method of claim 2, wherein evaluating whether the rule is successful further comprises determining whether an attribute of the node is blank.

4. The method of claim 1, wherein the rule specifies at least two paths.

5. The method of claim 1, wherein the rule comprises criteria for determining whether the rule is successful, and the step of applying the rule to the web page comprises using said criteria to evaluate whether the rule succeeds.

6. The method of claim 1, wherein the electronic address is a URL.

7. The method of claim 1, wherein the structured graph representation is a document object model representation.

8. The method of claim 1, wherein the rule is a not specific to any particular web page.

9. The method of claim 1, wherein the rule is associated with, and configured to be applied to each of a plurality of web pages of, a particular Internet domain.

10. The method of claim 1, wherein the rule is associated with, and configured to be applied to each of a plurality of web pages of, a particular web site.

11. The method of claim 1, wherein the rule is derived from a sample web page of said plurality of web pages.

12. The method of claim 1, wherein the method is performed by a client application that runs on the client computer in association with a web browser.

13. The method of claim 1, wherein the rule is one of a plurality of rules associated with a domain from which the web page was retrieved, and the method comprises retrieving the plurality of rules, and attempting to apply each of the plurality of rules to the web page to extract information therefrom.

14. The method of claim 1, wherein the rule specifies a plurality of paths, and applying the rule comprises evaluating, for each path, whether the path is suitable for use in extracting information from the web page.

* * * * *